United States Patent [19]

Fodale et al.

[11] Patent Number: 4,982,188

[45] Date of Patent: Jan. 1, 1991

[54] SYSTEM FOR MEASURING POSITIONAL CHARACTERISTICS OF AN EJECTED OBJECT

[75] Inventors: Robert Fodale, Massapequa; Herbert Hampton, Hauppauge, both of N.Y.

[73] Assignee: Grumman Aerospace Corporation, Bethpage, N.Y.

[21] Appl. No.: 246,714

[22] Filed: Sep. 20, 1988

[51] Int. Cl.$^5$ .................. G01B 11/26; G01C 1/00
[52] U.S. Cl. .................. 340/310.28; 356/141; 356/150
[58] Field of Search .............. 89/1.56, 1.51; 356/150, 356/141, 152, 375; 250/561, 560; 340/870.28

[56] References Cited

U.S. PATENT DOCUMENTS

| | | | |
|---|---|---|---|
| 4,136,568 | 1/1979 | Seymour | 356/141 |
| 4,168,123 | 9/1979 | Price | 356/150 |
| 4,373,808 | 12/1983 | Pell et al. | 356/152 |
| 4,419,012 | 12/1983 | Stephenson et al. | 356/141 |
| 4,488,050 | 12/1984 | Iwafune | 250/578 |
| 4,649,504 | 3/1987 | Krouglicof et al. | 356/141 |
| 4,684,249 | 8/1987 | Ellis | 356/152 |

OTHER PUBLICATIONS

Scientific American, "A New Form of the Fighting Aircraft", by Robert G. Skerrett, vol. CXIII, No. 24, N.Y., Dec. 11, 1915, front picture.

*Primary Examiner*—Donald J. Yusko
*Assistant Examiner*—Yuk H. Lau
*Attorney, Agent, or Firm*—Pollock, VandeSande & Priddy

[57] ABSTRACT

Conventionally, high-speed cameras are used to record the ejection of a store from an aircraft. The subsequent processing and analysis of the high-speed films are usually quite costly. The present invention system substantially reduces the cost of such processing and analysis by implementing a plurality of electro-optic sensors to detect sequentially individually energized LEDs mounted onto the to be ejected store. To sequentially activate the LEDs, receiver decoder electronics, located on the store, are used—provided signals are sent thereto by a radio control transmitter located in the aircraft. By formatting the data received by the electro-optic sensors, the different positional characteristics, such as the pitch rate, the velocity, the yaw rate and the roll rate, can be calculated in real time, either on board of the aircraft or at a remote location, the raw data having been transmitted thereto by means of a telemetry system, also located within the aircraft. The operation of the electro-optic sensors, the radio transmitter and the telemetry system are controlled by a processor.

11 Claims, 6 Drawing Sheets

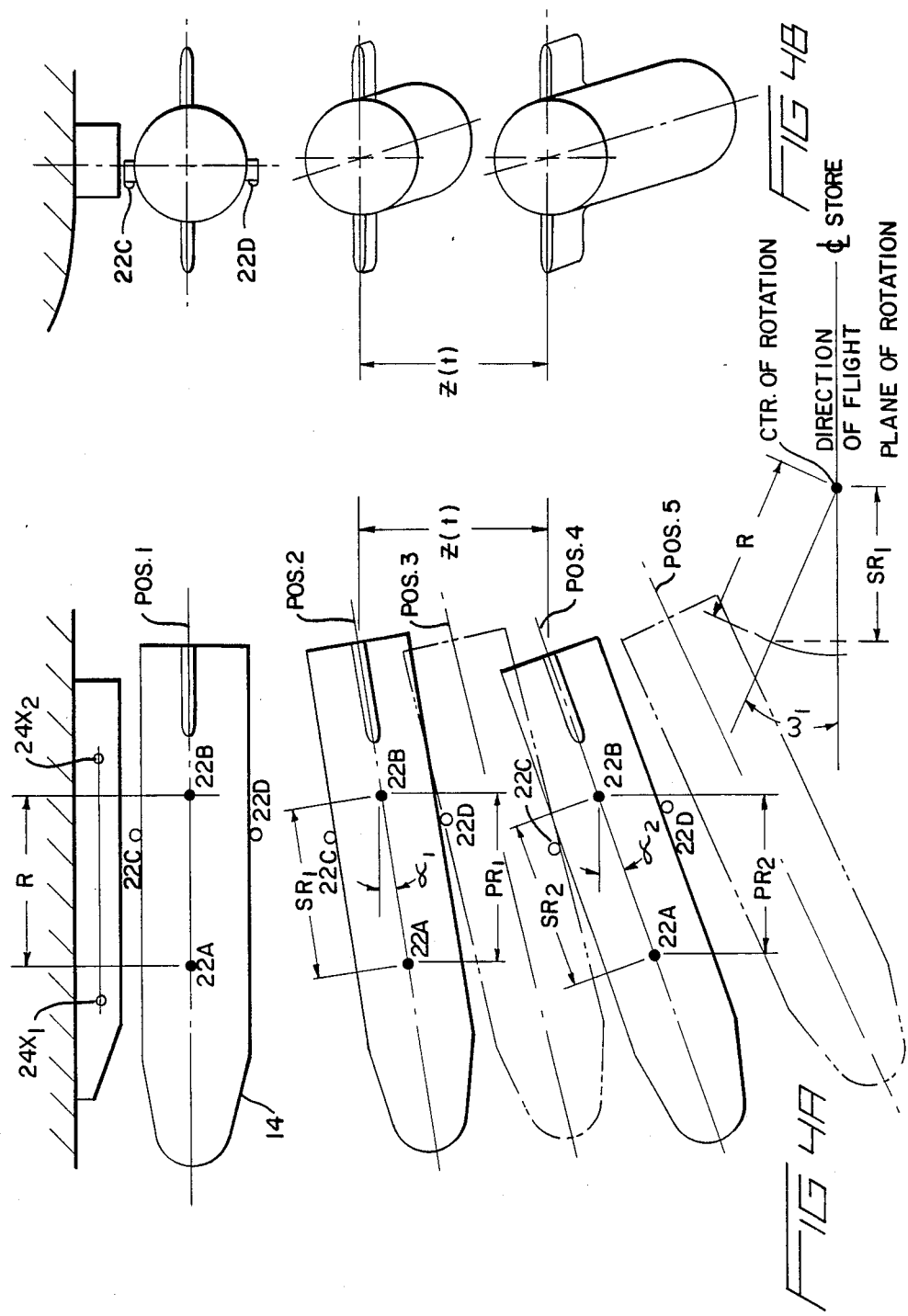

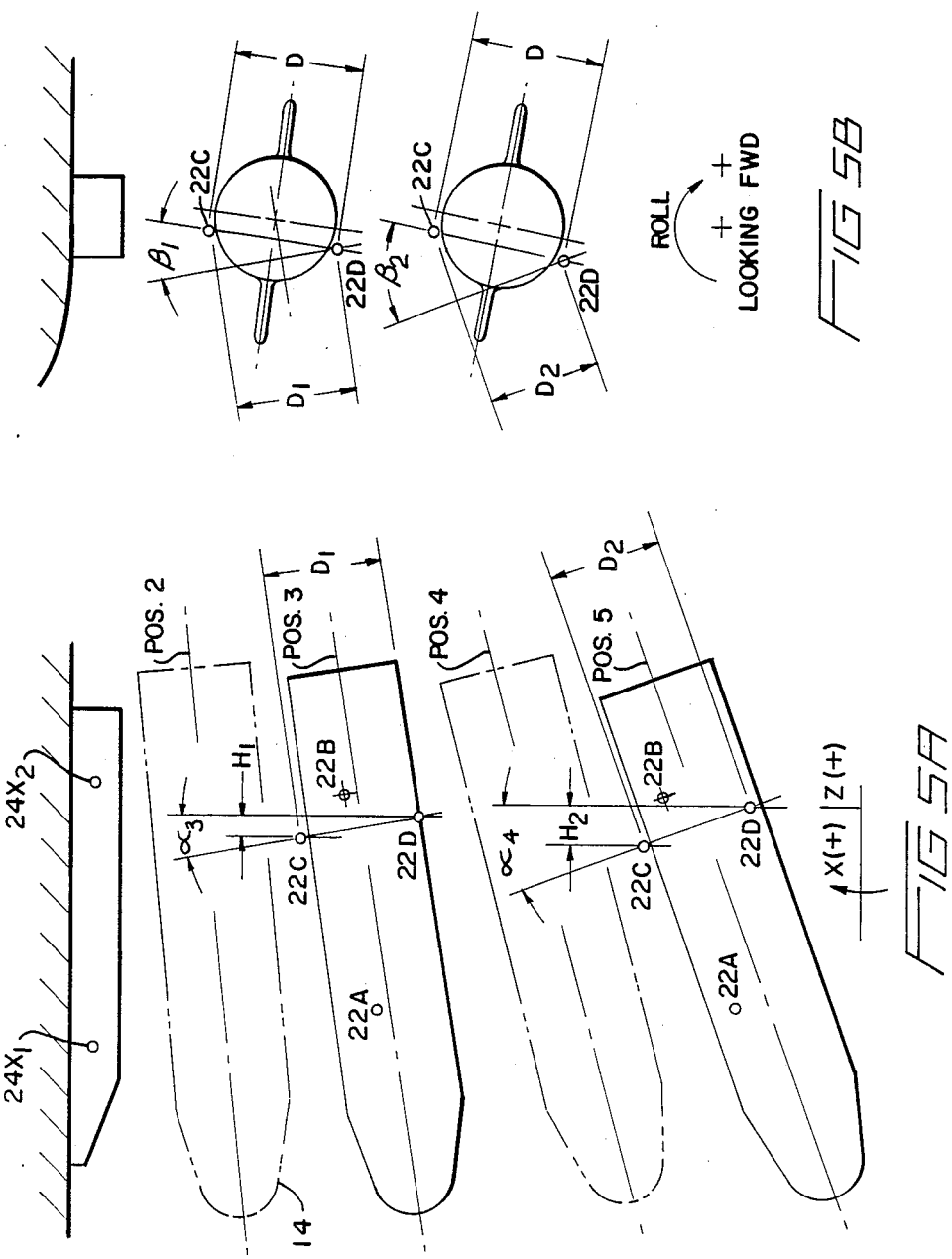

SYSTEM FOR MEASURING POSITIONAL CHARACTERISTICS OF AN EJECTED OBJECT

FIELD OF THE INVENTION

The present invention relates to a flight deflection measurement system and more particularly to a system for measuring the positional characteristics, such as pitch, yaw, velocity and roll, of an object released from a vehicle, such as an aircraft.

BACKGROUND OF THE INVENTION

At present, to measure the velocity, pitch rate, roll rate and yaw rate of a moving object, such as a bomb, missile or storage tank, hereinafter all referred to as a store, that is moving relative to a vehicle such as an aircraft, a spatial object or a reference base, multiple high-speed cameras, which are capable of taking two hundred pictures per second, are used to record the event of the store separating from the vehicle. Once the films have been taken, there needs to be a frame by frame analysis of the films after the vehicle has ceased operation and the films have been transported to a facility used solely for this analysis.

As is well known, the equipment and processes for analyzing the films are very complex and costly. Moreover, the analysis lies heavily on human input, that is, subjective judgement. This subjective judgement, in combination with the difference in the resolution of the films, the possible distortion of the lens of the cameras and the placement of the cameras relative to the store, all contribute a large dose of uncertainty, with respect to the measurement. In addition, the conventional systems preclude real time data gathering and analysis. Finally, the conventional analysis and processing often lead to security control problems inasmuch as these processes oftentimes provide for the disclosure of highly classified aircraft or missile configurations to people who otherwise should not be privy to such information.

BRIEF DESCRIPTION OF THE PRESENT INVENTION

The above-discussed problems are successfully resolved by the present invention system, which employs at least one electro-optic sensor for detecting light sequentially emitted from light emitting means fixed to the to be ejected object. The sequential lighting of the light emitting means is ordered by a radio transmitter, which is controlled by a controller that also controls the electro-optic sensor. Receiver decoder electronics integrated into the to be ejected object are used to receive the sequencing commands from the radio transmitter and to selectively energize the light emitting means in accordance to the sequence commands. By thus identifying the energized light emitting means, with reference to either a plane of reference or the aircraft, the different positional characteristics of the ejected object can easily be ascertained—by either the controller acting as a processor or a remote processor. To attenuate the potential for security leaks, a telemetry system is also connected to the controller for transmitting either the raw data measured by the electro-optic sensor to a remote ground station for calculation or, in the case where the positional characteristics are calculated on board, transmitting the thus calculated positional characteristics to a remote location for further analysis.

It is, thus, an objective of the present invention to provide for a measurement system which can measure in real time the positional characteristics of an object being ejected from a vehicle.

It is another objective of the present invention to provide a set of objective positional characteristics of an ejected object, absent human subjective analysis, moving relative to a vehicle.

It is yet another objective of the present invention to provide for a low cost, reliable and real time measurement system.

The above-mentioned objects and advantages of the present invention will become more apparent and the invention itself will be best understood by reference to the following description of an embodiment of the invention taken in conjunction with the accompanying drawings, wherein:

BRIEF DESCRIPTION OF THE DRAWINGS

FIGS. 4a and 4b respectively show a side view and a back view of a store as it is being ejected from a vehicle and as it relates to the measurement of the yaw rate;

FIGS. 5a and 5b the side and back views, respectively, of a store as it is being ejected from a vehicle and as it relates to the calculation of the roll rate.

DETAILED DESCRIPTION OF THE INVENTION

Figure 1:
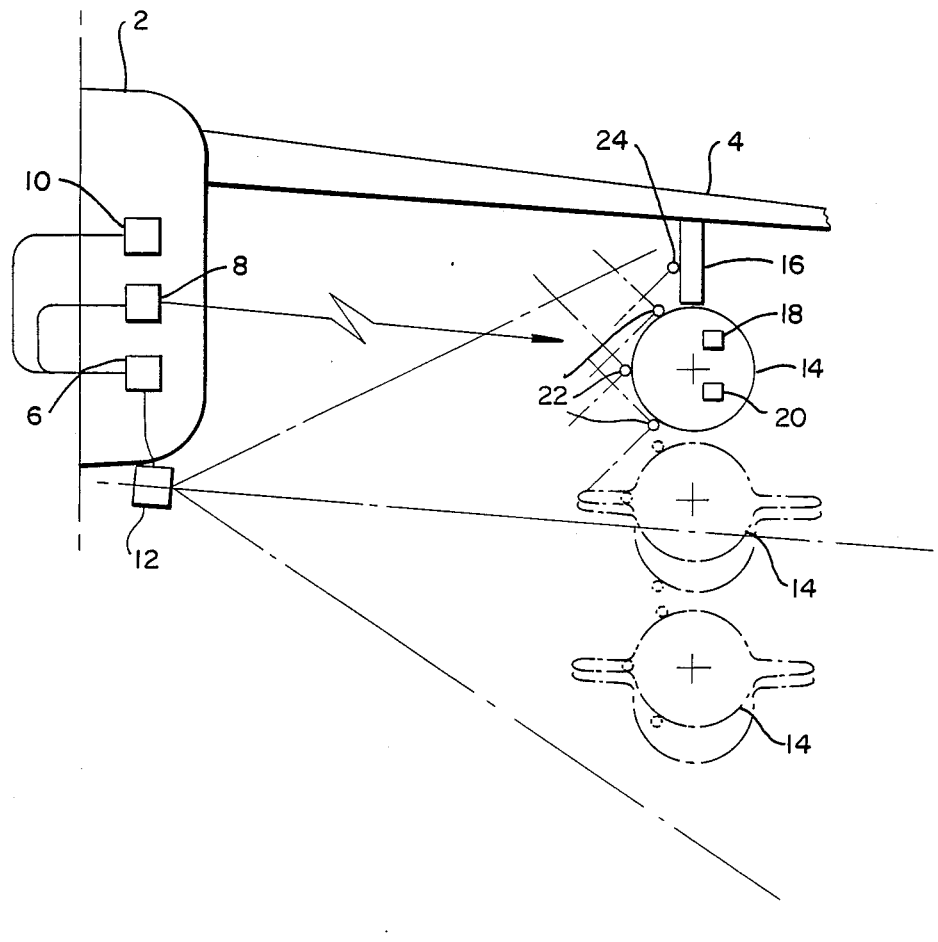
FIG. 1 is an illustration showing the basic components required for the present invention system.

FIG. 1 shows a portion of a fuselage 2 of an aircraft, and a partial view of a wing 4 extending therefrom. As shown in simplified block diagram format, mounted within fuselage 2 are a controller 6, a radio controlled transmitter 8 and a pulse code modulation (PCM) telemetry system 10. The controller, transmitter and telemetry system are connected, for example, as shown. Also connected to controller 6, but at the outside of the fuselage 2, or within fuselage 2 but provided at a window thereof, is an electro-optic sensor 12 which is positioned substantially in parallel to the plane of the underside of wing 4. A store 14 which is to be ejected from the aircraft is attached to wing 4 by means of pylon 16. It should be appreciated that an ejection means similar to that of a piston is resident in pylon 16 and is used to eject store 14 therefrom. Within store 14, as shown by boxes 18 and 20, are receiver decoder electronics and battery power pack, respectively. Fixed to store 14 is a number of targets 22 which, for this embodiment and better illustrated in FIGS. 3a, are light emitting diodes. Connected to pylon 16, as best illustrated in FIG. 3a, are light emitting diodes $24x_1$ and $24x_2$. These LEDs are used to establish a plane of reference, with respect to store 14.

Electro-optic sensor 12, which measures the angular displacement of a point light source, includes a cylindrical lens and a photosensitive diode array at the focal plane thereof. This composition and operation have been thoroughly discussed in Seymour U.S. Pat. No. 4,136,568, which is assigned to the same assignee as the instant invention. The '568 patent is hereby incorporated by reference. Telemetry system 10 is a conventional type of system which may also include a tape recorder, were the data collected by electro-optic sensor 12 to be manipulated right on board of the aircraft, instead of being transmitted to a remote location via a telemetry link for real time analysis. Needless to say, telemetry system 10 has to have the same bandwidth and filter characteristics as electro-optic sensor 12, which is capable of obtaining approximately two hundred samples per second. Radio control transmitter 8 is used to transmit to receiver decoder electronics 18, on board of store 14, the necessary sequencing information for energizing individually the target LEDs 22. Electro-optic sensor 12, telemetry system 10 and transmitter 8 are all controlled by controller 6, which is comprised of a conventional microprocessor which may also be used to calculate the different positional characteristics, such as pitch, yaw, roll and velocity, of the store as it is released from the aircraft, per software written in accordance with the specific discussions relating to these characteristics, to be given, infra.

As shown in FIG. 1, electro-optic sensor 12 is capable of surveying, as signified by the dash-dot lines encompassing pylon 16 and the two phantom-lined stores 14. Although a singular sensor 12 is adequate for measuring the pitch rate, yaw rate and velocity of the store, as it is being ejected from the aircraft, the operation of the present invention system is discussed hereinbelow with a system having four sensors 12a, 12b, 12c and 12d, shown in FIG. 2.

Figure 2:
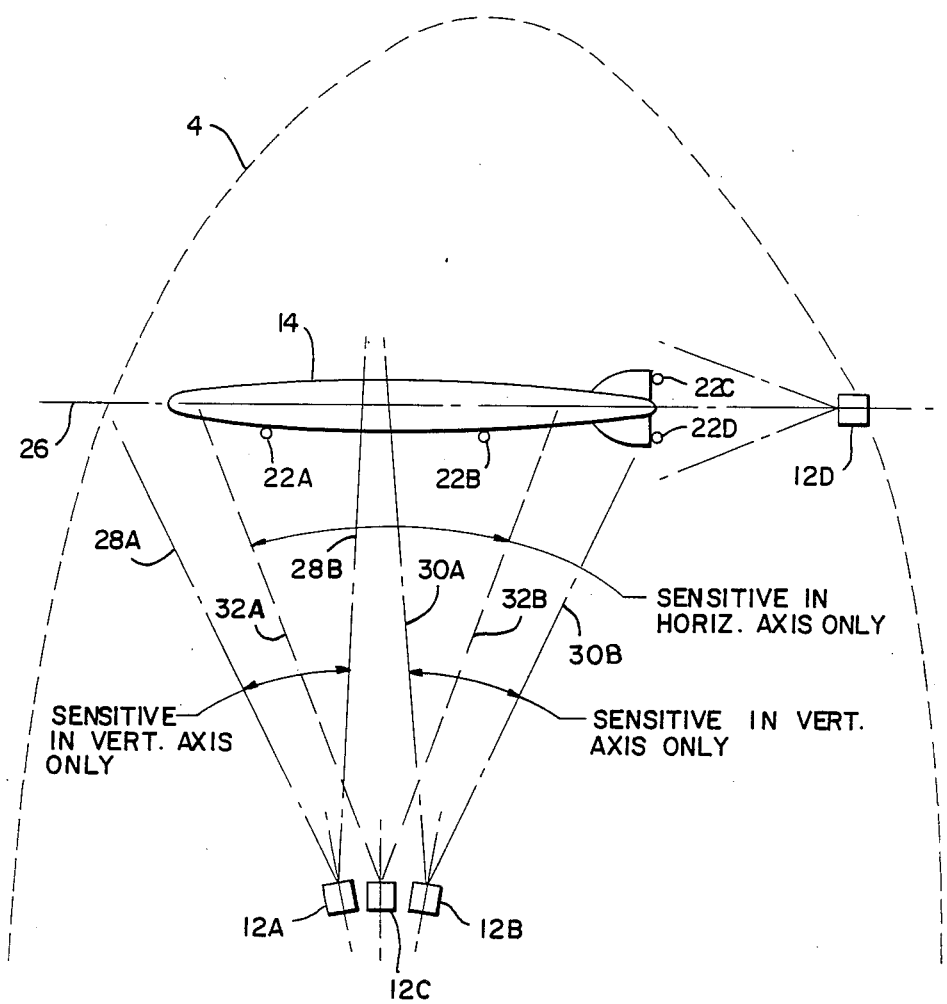
FIG. 2 is a plan view which shows the location of a store relative to a plurality of electro-optic sensors.

FIG. 2 is a plan view of store 14, relative to sensors 12a to 12c, all mounted underneath wing 4, designated by the dotted line. Assume for the moment that sensors 12a, 12b and 12c are mounted onto a common plate, underneath fuselage 2, and are positioned to view store 14 along its longitudinal axis, designated by line 26. Sensor 12d, on the other hand, is positioned, for the FIG. 2 embodiment, at the rear of store 14, and thus views.. the same along the latitudinal axis thereof. Sensor 12d is used to measure the roll rate of store 14 while sensors 12a, 12b and 12c are used to measure the vertical velocity, pitch rate and yaw angle of the same.

Figure 3B:
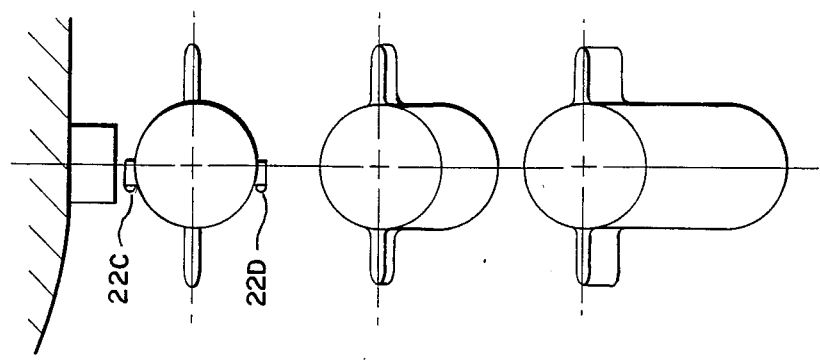
FIGS. 3a and 3b show, respectively, the side view and back view of a store as it is being ejected from a vehicle and the relationship of the different positions of the being ejected store with the pitch rate and velocity portions of the positional characteristics of the store.
Figure 3A:
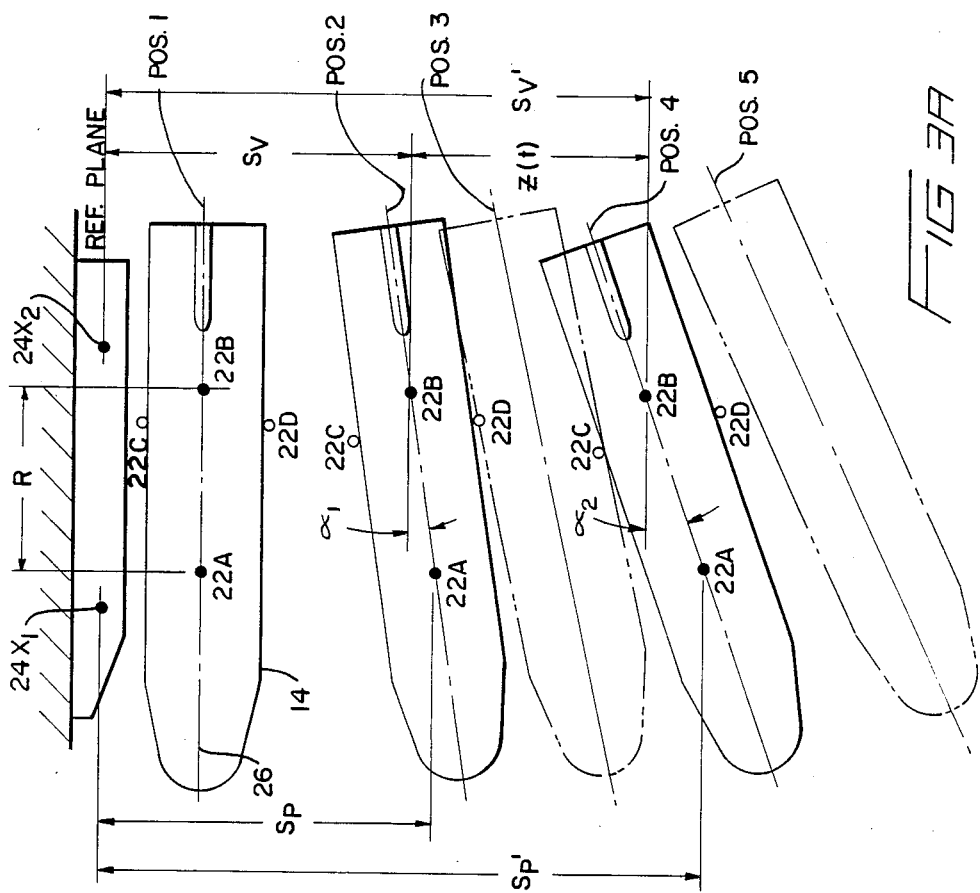

As shown more clearly in FIGS. 3a and 3b, LEDs, which may also to as targets, 22a and 22b are mounted along the longitudinal axis of store 14 while LEDs 22c and 22d are mounted orthogonal thereto, i.e, along the latitudinal axis of store 14. As shown in FIG. 2, LEDs 22c and 22d may also be mounted onto the tail stabilizer of store 14, along an axis orthogonal to axis 26.

Each of sensors 12a, 12b, and 12c has sensitive axes designated as 28a, 28b; 30a, 30b; and 32a, 32b; respectively. As illustrated, sensor 12a and 12b are positioned, with respect to fuselage 2, such that their respective sensitive axes record only the vertical displacement of store 14 as it departs from pylon 16. Sensor 12c, in the meantime, is positioned such that its sensitive axes record only the fore and aft displacements of store 14, as it is released from pylon 16.

Consider now FIGS. 3a and 3b wherein LEDs 24x₁ and 24x₂ form a plane of reference for store 14. As shown, as store 14 is ejected from pylon 16, it forms a pattern of different LED, i.e. target locations selected for demonstrating the positional characteristics which are to be measured. Although shown mounted to pylon 16, it should be appreciated that store 14 may be mounted anywhere on the aircraft, including the fuselage thereof, as long as the electro-optic sensors are aligned such that measurements along the longitudinal and latitudinal axes of the store may take place. LEDs 22a and 22b, mounted along the longitudinal axes of store 14, are primarily used to measure the vertical velocity, pitch rate and yaw angle of the store. LEDs 22c and 22d, mounted along a line perpendicular to the longitudinal axis, are used to measure the roll angle.

In operation, frequency commands are sent by transmitter 8, after having received the same from controller 6, to receiver decoder electronics 18. The respective LEDs along each axis of the store, or along each dimension thereof, are then sequentially lit, as store 14 is being ejected away from the aircraft. At the same time, since the sequence energizing and, therefore, when the respective LEDs are to be lit are known, by means of sensors 12a to 12d, the distance traveled by the individually lit LED can be measured, with reference to the plane of reference, established by LEDs 24x₁ and 24x₂. The movement of the store can therefore be tracked, irrespective of the configuration of the store—be it classified or otherwise. Thus, potential security problems do not arise since the configuration of the store no longer is photographed. Moreover, inasmuch as the measured data may be directly transmitted, in real time, to a location remote from the aircraft by means of telemetry system 10, turn around time for analyzing the positional characteristics of the store, as it leaves the aircraft, is greatly enhanced, thereby resulting in substantial cost savings.

To determine the pitch rate, attention is directed to FIGS. 3a and 3b where, as discussed previously, store 14 is shown, along its trajectory, in five different positions, with each position separated by a time interval $\Delta t$, which is the frame rate of the system. Starting position 1 can be used for the calibration of the system where the counts per unit of measurement are established. After ejection from the aircraft, the distance $S_v$ can be designated as the point at which the recording of data is to start. This may be equated with the point at which the ejector launcher (in the pylon) reaches the end of its stroke.

For the instant discussion of pitch rate determination, the data taken from store trajectory positions 2 and 4 are used. As was discussed previously, LEDs 24x₁ and 24x₂ define the reference plane for the measurement. LEDs 22a and 22b, located along line 26, are sequenced to be lit at positions 2 and 4, whereat the measurements are recorded. From the presented geometry, the expression for angle $\alpha_1$, at position 2, is:

$$\alpha_1 = \sin^{-1}\left(\frac{S_p - S_v}{R}\right) \tag{1}$$

and angle $\alpha_2$ at position 4 is:

$$\alpha_2 = \sin^{-1}\left(\frac{S_p' - S_v'}{R}\right) \tag{2}$$

It should be noted that R for equations 1 and 2 is the true length of the distance between target LEDs 22a and 22b; and by using R, the pitch angles $\alpha_1$ and $\alpha_2$ are not affected by changes in the roll and yaw angles of the store. Thus, the expression for the pitch rate of the store becomes:

$$\text{Pitch Rate} = \frac{\alpha_2 - \alpha_1}{2t} \quad (3)$$

As can be seen, the pitch direction is determined by a comparison of distances $S_p$ and $S_v$; and if $S_p$ is greater than $S_v$, the pitch is negative (−), whereas if $S_p$ is less than $S_v$, the pitch becomes positive (+).

For the discussion of the yaw rate determination, attention is directed to FIGS. 4a and 4b. As before the trajectory of store 14 is shown by means of five different positions. Yet because FIGS. 4a and 4b deal with the yaw rate of the store, it should be appreciated that, as shown in FIG. 4b, the store is turned, as illustrated, toward the right, for respective positions 2 and 4. For the horizontal displacement data, which is to be measured by sensor 12c (see FIG. 2) the store positional data is taken with respect to positions 2 and 4. As before, R represents the actual distance between target LEDs 22a and 22b. Values $PR_1$ and $PR_2$, shown for positions 2 and 5, respectively, are used to determine the yaw angles $\omega_1$ and $\omega_2$ and the yaw rate. Value $R_1$ is the measured distance between target LEDs 22a and 22b. From simple geometry, the following two equations are calculated $$\omega_1 = \cos^{-1}\left(\frac{SR_1}{R}\right) \text{ where } SR_1 = \frac{PR_1}{\cos \alpha_1} \quad (4)$$

$$\omega_2 = \cos^{-1}\left(\frac{SR_2}{2}\right) \text{ where } SR_2 = \frac{PR_2}{\cos \alpha_2} \quad (5)$$

and since $\alpha_1$ and $\alpha_2$, the pitch angles, had previously been calculated, the following equation results:

$$\text{Yaw Rate} = \frac{\omega_2 - \omega_1}{2t} \quad (6)$$

The roll rate is discussed with respect to FIGS. 5a and 5b. As shown, data taken from the trajectory of store positions 3 and 5 are used to determine the roll rate. Target LEDs 22c and 22d, which lie perpendicular to the longitudinal axis of store 14, are sequenced to be lit at positions 3 and 5. Sensor 12c, which measures displacements in the horizontal plane, is used to measure displacements $H_1$ and $H_2$. From measured displacement $H_1$ and $H_2$, the angles $\alpha_3$ and $\alpha_4$ can be derived from the previously calculated pitch rate. Thus, in accordance to the following formula $$\text{Pitch Angle Change/Frame} = \frac{\text{Pitch Rate (RAD sec)}}{\text{Frame Rate (Millisec)}} \quad (7)$$

and the subsequent calculations $$\alpha_3 = \alpha_2 + \text{Pitch Angle Change/Frame} \quad (8)$$

$$\alpha_1 = \alpha_2 + 3(\text{Pitch Angle Change/Frame}) \quad (9)$$

$D_1$ and $D_2$ can be obtained as follows:

$$D_1 = \frac{H_1}{\sin \alpha_3} \quad D_2 = \frac{H_2}{\sin \alpha_4} \quad (10)$$

Having thus determined $D_1$ and $D_2$, the roll angles $\beta_1$ and $\beta_2$ can be solved, as constant D, which is the true length of the distance between target LEDs 22c and 22d for immunizing $\beta_1$ and $\beta_2$ from any changes in the store yaw angle, is used in the following equations. By using sensor 12d the angles $\beta_1$ and $\beta_2$ can be measured directly with increased resolution if more accurate results are desired.

$$\beta_1 = \cos^{-1}\left(\frac{D_1}{D}\right) \quad (11)$$

$$\beta_2 = \cos^{-1}\left(\frac{D_2}{D}\right) \quad (12)$$

and the roll rate becomes $$\text{Roll Rate} = \frac{\beta_2 - \beta_1}{2t} \quad (13)$$

It should be noted that data from target LEDs 22b, 22c and 22d are also taken at store positions 3 and 5 by sensors 12a and 12b, which are sensitive to the vertical axis only. From these measurements, whether the rolling motion of the store is positive or negative is determined. By comparing the distances between target LEDs 22b, 22c and 22d, it can be found that if the distance between LED 22b and 22c is less than the distance between LEDs 22b and 22d, the roll is positive. Conversely, if the distance between LEDs 22b and 22c is greater than that between LEDs 22b and 22d, then the roll direction is negative.

Figure 6:
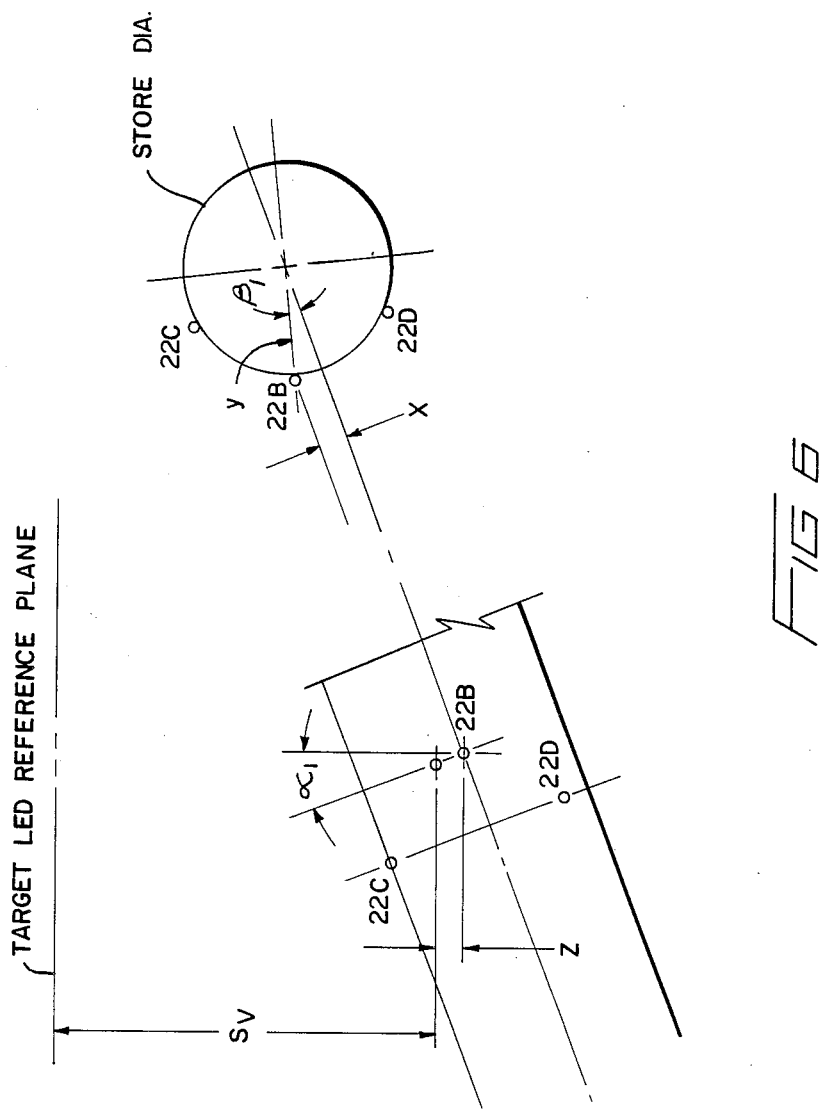
FIG. 6 is a diagram illustrating the error component due to the roll of the store which must be eliminated in order to obtain the velocity.

Refer now back to FIG. 3 for the velocity determination of the store. For the velocity calculation, the values of SV and SV' are required. In addition, these values should also be normalized by removing the error component caused by the roll of the store. As shown in FIG. 6, z must be calculated and either added or subtracted from the values of SV and SV' before calculating the velocity. As the $\beta$ angles have already been computed for the stored positions 2 and 4, the value of Y becomes the measured distance from the center of the store to target LED 22b. Accordingly, the following equation is obtained:

$$z = y \sin \beta \cos \alpha_1 \quad (14)$$

From equation 14, the velocity of the store can then be calculated as $$V = \frac{(SV' \pm y \sin \beta_2 \cos \alpha_2) - (SV \pm y \sin \beta_1 \cos \alpha_1)}{2t} \quad (15)$$

And by storing the aforelisted equations into the controller, or a memory therefor, it can be seen that the need for film processing and subsequent analysis can be totally eliminated. As was mentioned previously, the real time processing can either take place right on the vehicle or the raw data can be directly transmitted, by means of the telemetry system, to a remote location for calculation and analysis.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

What is claimed is:

1. System for measuring three-dimensional positional characteristics of an object ejected from a body, comprising:
   a plurality of light emitting means located on the object;
   means located on the body for establishing a plane of reference;
   means for telemetrically energizing the light emitting means on the object, with respect to each dimension, individually and sequentially;
   means located on the body for spatially identifying when each of the light emitting means is lit and providing output identified lit data relating to when each of the light emitting means is lit;
   control means for actuating the telemetrically energizing means and for using the identified lit data to calculate the positional characteristics of the object, relative to the plane of reference.

2. The system of claim 1, wherein the telemetrically energizing means comprises:
   a radio transmitter located on the body for transmitting sequencing commands to the object; and
   receiver decoder electronics located on the object for determining the sequencing commands and energizing the light emitting means accordingly.

3. The system of claim 1, wherein the reference plane establishing means comprises at least two light emitting means.

4. The system of claim 1, wherein the identifying means comprises:
   at least one electro-optic sensor means mounted onto the body for viewing the light emitting means located on the object along the longitudinal axis thereof; and
   at least one electro-optic sensor means mounted onto the body for viewing the light emitting means located on the object along the latitudinal axis thereof.

5. The system of claim 1, further comprising:
   telemetry means located on the body for transmitting the positional characteristics in real time to a location remote from the body.

6. The system of claim 4, wherein the electro-optic sensor means for viewing the light emitting means along the longitudinal axis of the object provides the positional characteristics signifying the velocity, pitch and yaw of the object; and
   wherein the electro-optic sensor means for viewing the light emitting means along the latitudinal axis of the object provides the positional characteristics signifying the roll of the object.

7. System for measuring three-dimensional positional characteristics of a first body being ejected from a second body, comprising:
   means located on the second body for establishing a plane of reference;
   a plurality of light emitting means located on the first body, at least two of the light emitting means being positioned along each dimension of the first body;
   transmitter means located on the second body for remotely transmitting sequencing commands towards the first body;
   receiver decoder electronics located on the first body for receiving and determining the sequencing commands to energize individually and sequentially the appropriate light emitting means positioned along each dimension of the first body;
   means located on the second body for spatially identifying and providing output data related to when each of the light emitting means is lit;
   control means for actuating the transmitter means and for using the output data of the identifying means to calculate the positional characteristics of the first body relative to the reference plane.

8. The system of claim 7, further comprising:
   telemetry means located on the second body for transmitting the positional characteristics to a location remote from the second body.

9. The system of claim 7, wherein the identifying means comprises:
   a plurality of electro-optic sensor means mounted on the second body for viewing the light emitting means located on the first body along the longitudinal axis thereof; and
   at least one electro-optic sensor means mounted on the second body for viewing the light emitting means located on the first body along the latitudinal axis thereof.

10. The system of claim 9, wherein the plurality of longitudinal axis viewing electro-optic sensor means comprises:
    at least three electro-optic sensor means for measuring the velocity, pitch and yaw of the first body, relative to the second body.

11. The system of claim 9, wherein the electro-optic sensor means mounted on the second body for viewing the latitudinal axis of the first body measures the roll of the first body, relative to the second body.

* * * * *

UNITED STATES PATENT AND TRADEMARK OFFICE
CERTIFICATE OF CORRECTION

PATENT NO. : 4,982,188

DATED : January 1, 1991

INVENTOR(S) : Robert Fodale, et al.

It is certified that error appears in the above-identified patent and that said Letters Patent is hereby corrected as shown below:

Column 2, line 32, after "5b" insert --illustrate--.

Column 3, line 42, after "views" delete "..".

Column 3, line 47, after "also" insert --be referred--.

Column 5, in Equation (5), "$\left(\frac{SR_2}{2}\right)$" should be --$\left(\frac{SR_2}{R}\right)$--.

Column 8, line 22, change "related" to --relating--.

Signed and Sealed this

Ninth Day of June, 1992

Attest:

DOUGLAS B. COMER

*Attesting Officer*     *Acting Commissioner of Patents and Trademarks*